US007367434B2

(12) United States Patent
Sato et al.

(10) Patent No.: US 7,367,434 B2
(45) Date of Patent: May 6, 2008

(54) ELECTRIC POWER CLAMPING APPARATUS

(75) Inventors: Toshio Sato, Tsukuba-gun (JP); Akira Tadano, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/956,154

(22) Filed: Oct. 4, 2004

(65) Prior Publication Data

US 2005/0126865 A1 Jun. 16, 2005

(30) Foreign Application Priority Data

Dec. 15, 2003 (JP) ............................ 2003-416862

(51) Int. Cl.
*F16D 55/08* (2006.01)

(52) U.S. Cl. .................. 188/72.9; 188/72.1; 188/72.3; 74/625

(58) Field of Classification Search ............... 188/72.9, 188/73.34, 73.1, 206 R, 156, 157, 158, 72.1, 188/72.3, 72.7; 74/625; 269/216, 228
See application file for complete search history.

(56) References Cited

U.S. PATENT DOCUMENTS 5,379,867 A * 1/1995 Macke et al. .............. 188/71.9
5,542,504 A * 8/1996 Berwanger ................. 188/71.8
5,755,293 A * 5/1998 Bourke ........................ 173/29
6,073,504 A * 6/2000 Gleixner et al. ........... 74/89.14
6,446,768 B2 * 9/2002 Kikuta et al. ............... 188/162
6,557,840 B2 * 5/2003 Sawdon ....................... 269/32
6,612,557 B2 * 9/2003 Sawdon et al. ............... 269/32
2004/0150149 A1 * 8/2004 Zhao et al. .................... 269/32

FOREIGN PATENT DOCUMENTS

| | | |
|---|---|---|
| DE | 20018114 U1 | 4/2002 |
| DE | 10159874 C1 | 2/2003 |
| DE | 102004005014 A1 | 8/2004 |
| JP | 2001-105332 | 4/2001 |
| JP | 2001-310225 | 11/2001 |

* cited by examiner

*Primary Examiner*—Melody M. Burch
(74) *Attorney, Agent, or Firm*—Oblon, Spivak, McClelland, Maier & Neustadt, P.C.

(57) ABSTRACT

In an electric power clamping apparatus that locks a clamping arm when it is not driven by an electric motor attached with the a brake mechanism, manual operation of the clamping arm is facilitated. In an electric power clamping apparatus for transmitting an output of an electric motor via a reduction drive system to a clamping arm, an operation shaft including a small gear meshing with a gear that forms a part of the reduction drive system by pressing with an external tool is fit by insertion rotatably and movably back and forth into a body, and a linkage mechanism is provided in the operation shaft for operating a release lever in a brake mechanism to make the brake mechanism inoperative when the small gear meshes with the gear of the reduction drive system.

12 Claims, 2 Drawing Sheets

ELECTRIC POWER CLAMPING APPARATUS

FIELD OF THE INVENTION

The present invention relates to an electric power clamping apparatus for clamping a workpiece for processing such as welding, and more specifically, to an electric power clamping apparatus provided with a manual operation mechanism of a clamping arm.

DESCRIPTION OF THE RELATED ART

As power clamping apparatus for clamping workpiece for processing or the like, various apparatuses arranged so as to drive clamping arms with electric motors have been proposed and used conventionally. In those electric power clamping apparatuses, according to need, manual operation mechanisms are provided for manually operating the clamping arms when they can not be driven due to a power failure, power supply failure, or the like.

Accordingly, in the case of using an electric motor or the like with a brake mechanism to lock the clamping arm when the electric motor is not driven, for the manual operation of the clamping arm, it is necessary to make the brake mechanism inoperative and manually operate the clamping arm, so that not only the operationality thereof is bad, but it also is possible to cause an unexpected contingency due to the inoperative brake mechanism if the brake mechanism remains inoperative and the electric motor is energized without recovering the mechanism.

A technical object of the invention is to provide an electric power clamping apparatus arranged so as to lock a clamping arm using the electric motor when it is not driven by a brake mechanism provided in the drive system thereof, to further facilitate the manual operation of the clamping arm, and more specifically, to make the brake mechanism inoperative and manually operate the clamping arm by a single operation with a single tool.

Another technical object of the invention is to provide an electric power clamping apparatus arranged so as to prevent beforehand energization of the electric motor while keeping the brake mechanism inoperative.

SUMMARY OF THE INVENTION

In order to solve the above described problem, the invention is characterized in that, in an electric power clamping apparatus for transmitting an output of an electric motor via a reduction drive system to a clamping arm for clamping operation thereof, an operation shaft including a small gear meshing with a gear that forms a part of the reduction drive system by pressing with an external tool is fit by insertion, rotatable and movable back and forth, into a body of the apparatus, and linkage means is provided in the operation shaft for operating a release lever in a brake mechanism attached to a drive system of the electric motor to make the brake mechanism inoperative when the small gear of the operation shaft meshes with the gear of the reduction drive system.

In the electric power clamping apparatus having the above described construction, when the apparatus can not be driven due to a power failure, power supply failure, or the like, in order to manually operate the clamping arm by the manual operation mechanism, the operation shaft is rotated after the operation shaft is pressed by the tool to mesh the small gear at the tip end of the operation shaft with the gear in the reduction drive system. By pressing the operation shaft, the release lever in the brake mechanism is operated via the linkage means, thereby making the brake mechanism inoperative. Further, by the rotation of the operation shaft, the clamping arm is driven via the gear of the reduction drive system from the small gear of the operation shaft, thereby moving the clamping arm to an arbitrary position.

If the tool is detached from the operation shaft during the manual operation, because the operation of the release lever in the brake mechanism is released, the brake mechanism is recovered and the clamping arm is held in the position.

In a preferred embodiment of the invention, as the gear of the reduction drive system and the small gear of the operation shaft, bevel gears meshing with each other are used. Further, it is effective to fit the operation shaft by insertion into the body with an operation end of the operation shaft facing an opposite side to an operation range of the clamping arm in the body for facilitating the manual driving operation of the clamping arm.

Furthermore, as the linkage means, an operation link mechanism or a bent spring material having one end engaging with the operation shaft and the other end engaging with the release lever of the brake mechanism can be used. Further, it is effective to provide a sensor in the body for detecting an operating state of a manual operation mechanism according to a position of the operation shaft for preventing accidental energization of the electric motor at the time of manual operation.

According to the electric power clamping apparatus of the invention as described above in detail, the manual operation of the clamping arm is facilitated, that is, the brake mechanism can be made inoperative and the clamping arm can be manually operated by a single operation with a single tool. Further, energization of the electric motor while keeping the brake mechanism inoperative can be prevented beforehand.

DETAILED DESCRIPTION OF THE INVENTION

Figure 1:
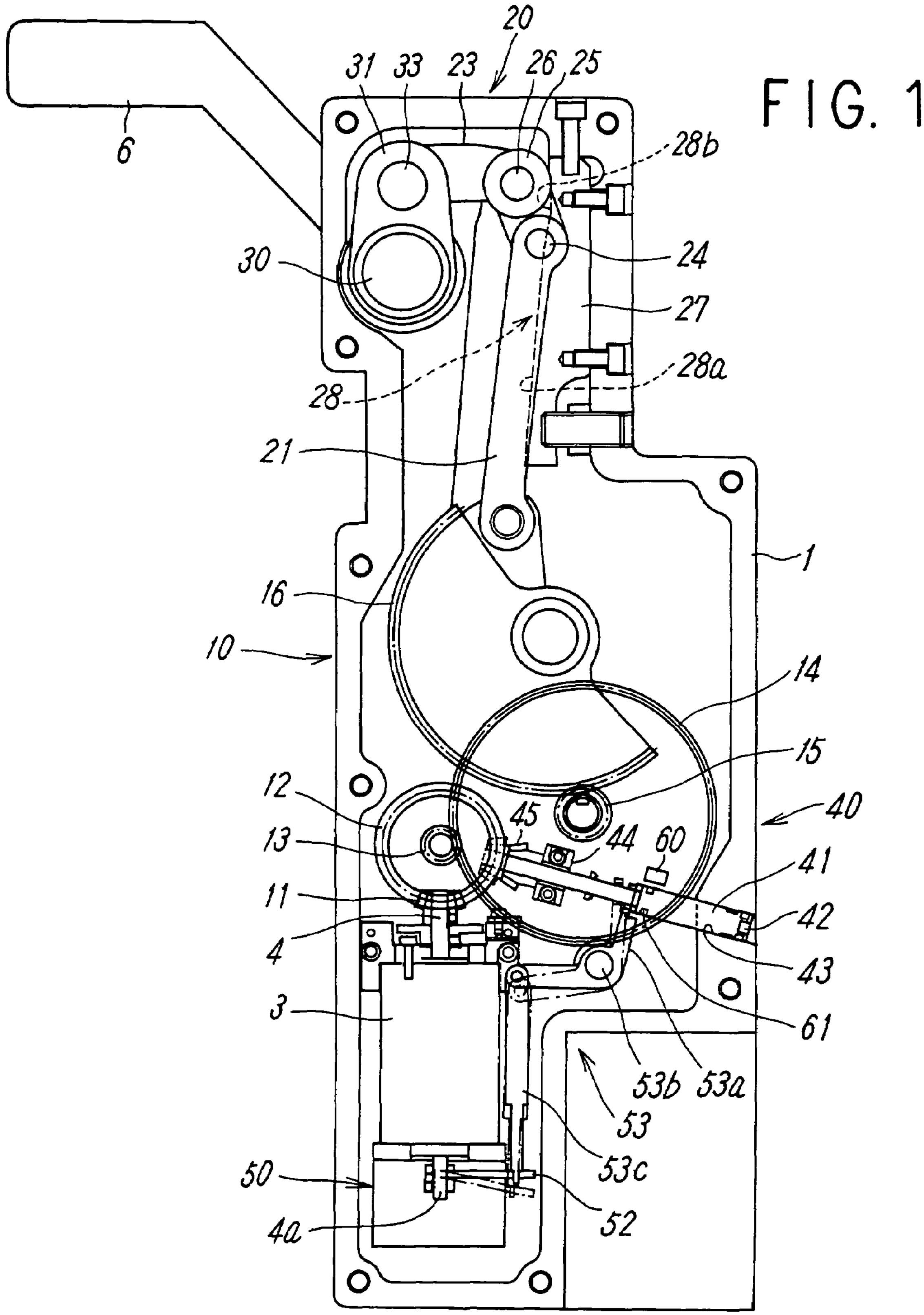
FIG. 1 is a longitudinal sectional view of the first embodiment of the electric power clamping apparatus according to the invention.

FIG. 1 shows the first embodiment of an electric power clamping apparatus according to the invention. This electric power clamping apparatus includes an electric motor 3 as a drive source within a body 1, and further includes a reduction drive system for transmitting the output of the electric motor 3 to a clamping arm 6 for clamping operation thereof. This reduction drive system includes a reduction mechanism 10 having multistage gears 11 to 16 driven by an output shaft 4 of the motor 3 for reducing the rotation thereof and a link mechanism 20 connected to the reduction mechanism 10 for operating the clamping arm 6. The reduction mechanism 10 includes a small bevel gear 11 mounted on the output shaft 4 of the electric motor 3, a bevel gear 12 for meshing therewith, a pinion 13 being coaxial and integrated with the bevel gear 12, a wheel 14 for meshing with the pinion 13, a pinion 15 being coaxial and integrated with the wheel 14, and a wheel 16 for meshing with the pinion 15 substantially in the form of a semicircle in the final stage. Thus the rotation of the electric motor 3 is largely reduced and the torque is increased, and transmitted to the wheel 16 in the final stage. Incidentally, the reduction mechanism 10 is not necessarily formed entirely by gear reduction mechanisms, but other mechanisms for reduction can be combined.

A crank link 21 in the link mechanism 20 is rotatably connected to the wheel 16 in the final stage in the reduction mechanism 10 in the periphery thereof, and serves as a crank gear for driving the distal end of the crank link 21 by conversion into linear motion within the range in which the wheel 16 rotates nearly a half-turn. Accordingly, the output of the electric motor 3 is transmitted to the distal end of the crank link 21 as a substantially linear motion.

On the other hand, one end of a cam follower link 23 having a cam follower 25 is rotatably connected to the distal end of the crank link 21 by a pin 24, and the other end of the cam follower link 23 is rotatably connected by a connecting shaft 33 to an end of a drive lever 31 protruding from a clamping arm shaft 30 rotatably supported by the body 1.

The cam follower link 23 is bent at the middle part and rotatably supports the cam followers 25 at both ends of a cam follower shaft 26 provided in the bent part. The bent part of the cam follower link 23 is formed by bending the other end of the cam follower link 23 toward the end of the drive lever 31 at substantially a right angle or an angle near the right angle.

Further, a track 27 having a cam track surface 28 substantially along the moving direction of the distal end of the crank link 21 is provided within the body 1 for guiding the movement of the cam follower 25 provided in the bent part of the cam follower link 23, and the cam follower 25 rotationally moves along a predetermined path provided by the track surface 28 on the linear driving of the crank link 21. This cam track surface 28 is formed in a suitable configuration for obtaining a predetermined clamping force, and, in the illustrated example, formed by a linear cam surface 28*a* accounting for a large part of the length of the cam track surface and a cam surface 28*b* of an ark having a large radius of curvature in the vicinity of the continued terminal end (clamping force generating part) or a curve of an approximation thereof.

The shaft end protruding from the body 1 of the clamping arm shaft 30 that is rotationally driven by the drive lever 31 defines a square shaft, and the base end of the clamping arm 6 is mounted on the shaft end.

In the body 1, a manual operation mechanism 40 is provided for manually operating the clamping arm 6 when the clamping arm 6 can not be driven because of a power failure, power supply failure, or the like. An operation shaft 41 forming the manual operation mechanism 40 is fit by insertion rotatably and movably back and forth into a shaft hole 43 and a middle bearing 44 provided so as to open to the opposite side to the operation range of the clamping arm 6 in the body 1, and has an operation end having a tool receiver (hexagon bore) 42 facing the opening. This operation shaft 41 includes a small bevel gear 45 at the end thereof for meshing with the bevel gear 12 that forms a part of the reduction drive system 10 by the pressing by an external tool (hexagon wrench or the like). Further, in the operation shaft 41, linkage means 53 is provided for operating a release lever 52 in a brake mechanism 50 attached to the electric motor 3 so as to make the brake mechanism 50 inoperative when the gear 45 meshes with the gear 12 of the reduction drive system 10.

Note that the brake mechanism 50 is not necessarily attached to the electric motor 3 itself, but can be provided to the drive system of the electric motor appropriately.

The brake mechanism 50 is for providing a braking force to the rotation of a circular plate (not shown) connected to a rotational shaft 4*a* protruding to the brake side of the electric motor 3 by pressing the outer end of the release lever 52, and various known mechanisms can be adopted.

Further, as the linkage means, as illustrated in FIG. 1, an operation link mechanism 53 having one end engaging with the middle portion of the operation shaft 41 and the other end engaging with the release lever 52 of the brake mechanism 50 can be used. This operation link mechanism 53 is formed by a first link 53*a* rotatably supported by the body 1 with a pin 53*b* and having one end engaging with the operation shaft 41, and a second link 53*c* connected between the other end of the first link 53*a* and the release lever 52, and configured to move the release lever 52 from the solid line position to the chain line position by pressing the operation shaft 41 with the tool, so as to make the brake mechanism 50 inoperative. Incidentally, although the recovery of the release lever 52 and the operation link mechanism 53 is performed by a recovery spring provided on the brake mechanism 50, a spring or the like for the recovery may be provided to the operation shaft 41.

When the operation shaft 41 makes the brake mechanism 50 inoperative by operating the release lever 52 in the brake mechanism 50 with the linkage means engaged therewith, the clamping arm 6 can be manually driven by meshing the gear 45 at the end of the operation shaft 41 with the gear 12 of the reduction drive system 10, and thus rotating the tool mounted in the tool receiver 42 of the operation end of the operation shaft 41 facing the opening of the shaft hole 43 of the body 1.

The gear 12 of the reduction drive system 10 and the small gear 45 of the operation shaft 41 are bevel gears meshing with each other, but are not limited thereto. Further, the gear 45 at the end of the operation shaft 41 is preferably meshed with a gear near the electric motor 3 in the reduction drive system 10, but the gear is not limited to the illustrated gear 12.

Further, in the body 1, a sensor 60 is provided for detecting the operating state of the manual operation mechanism 40 according to the position of the operation shaft 41. This sensor 60 is a sensor for detecting the contact or separation of a magnet 61 provided to the operation shaft 41, however, various sensors for detecting movement of the operation shaft 41 can be used. The output of the sensor 60 can provide the energization of the driver circuit of the electric motor 3 to the operation of a switching means for temporarily stopping the manual operation mechanism 40 during operation, or the operation of the indication means for clearly indicating that the manual operation mechanism 40 is on the operation.

In the electric power clamping apparatus having the above described constitution, the wheel 16 in the final stage is rotationally driven by the driving of the reduction drive system by the electric motor 3. While the rotational motion is transmitted to the crank link 21 as substantially linear motion, the cam follower 25 provided in the bent part of the cam follower link 23 connected to the end of the distal end of the crank link 21 rotationally moves on the cam track surface 28 of the track 27 in contact therewith. Accordingly, the cam follower link 23 itself moves to the illustrated position while rotating around the cam follower shaft 26, thereby rotating the drive lever 31 and rotatably driving the clamping arm shaft 30. As a result, the clamping arm 6 is rotationally driven by the clamping arm shaft 30 and workpiece is clamped on a table (not shown).

In the link mechanism 20, since the cam follower link 23 forms a toggle mechanism for stably holding the clamping force by the clamping arm 6 together with the track 27 having the cam track surface 28 on which the cam follower 25 rotatably moves, by the action of the toggle mechanism, in a state when the clamping arm 6 clamps the workpiece, there is substantially no force component for driving the cam follower link 23 in the recovery direction in a reactive force transmitted to the cam follower link 23 via the drive lever 31. Accordingly, after the workpiece is held, the hold on the workpiece is maintained even when the driving force of the drive source is cut off, the state in which the workpiece is clamped on the table is held stably.

Further, when the electric power clamping apparatus can not be driven due to a power failure, power supply failure, or the like, the clamping arm 6 is manually operated by the manual operation mechanism 40. In this case, the operation shaft 41 may be rotated after the operation shaft 41 is pressed by the tool to mesh the small gear 45 at the end of the operation shaft 41 with the gear 12 in the reduction drive system 10. By the pressing of the operation shaft 41, the release lever 52 in the brake mechanism 50 attached to the electric motor 3 is operated via the first and second links 53*a* and 53*b* in the operation link mechanism 53, thereby making the brake mechanism 50 inoperative. Further, by the rotation of the operation shaft 41 in such a state, the clamping arm 6 is driven via the gear 12 of the reduction drive system 10 from the small gear 45 of the operation shaft 41, thereby moving the clamping arm 6 to an arbitrary position.

Furthermore, if the tool is detached from the operation shaft 41 during manual operation, because the operation of the release lever 52 in the brake mechanism 50 is released, the brake mechanism 50 is recovered and the clamping arm 6 is held in the position by the operation of the brake mechanism 50.

Figure 2:
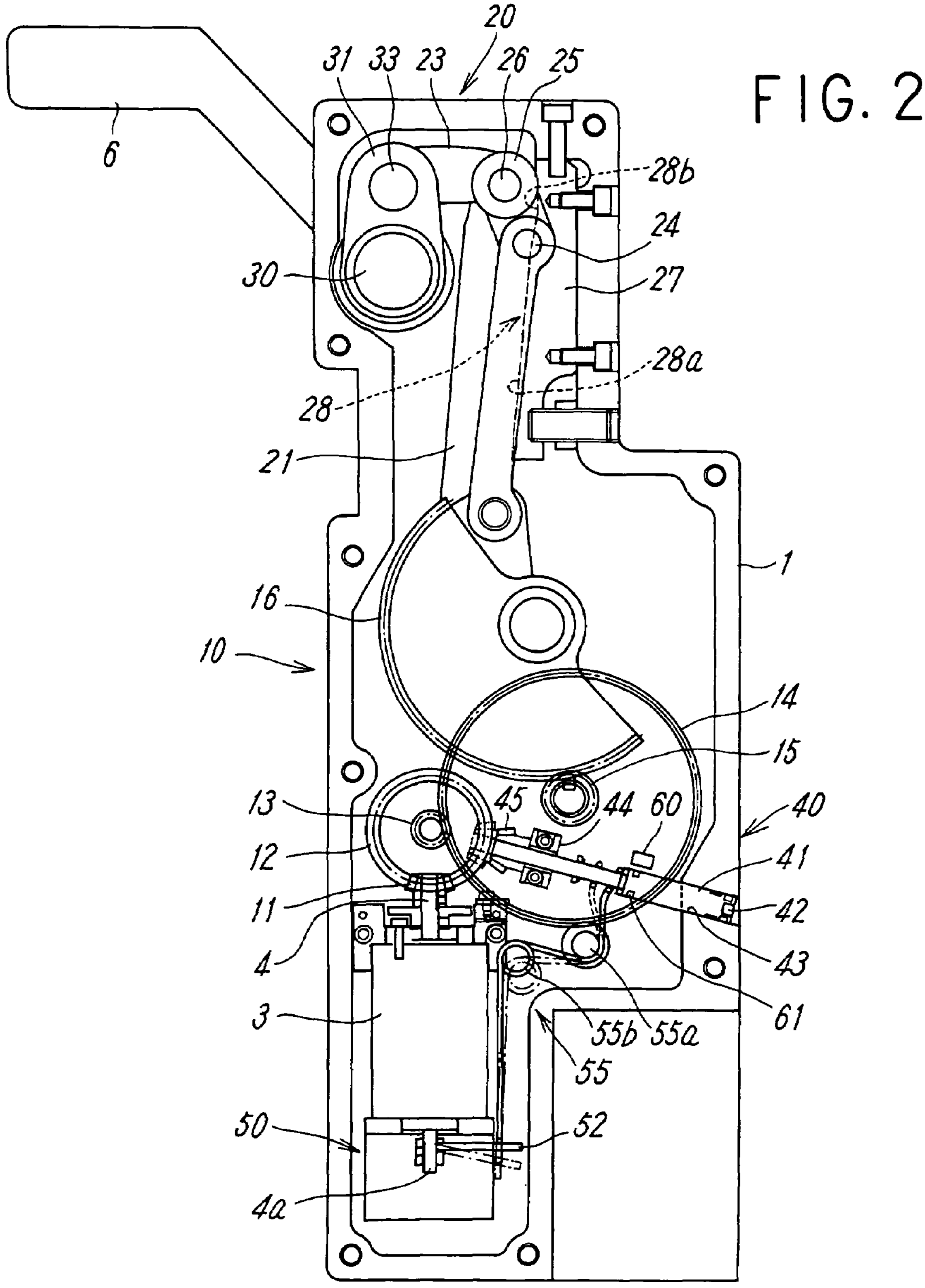
FIG. 2 is a longitudinal sectional view of the second embodiment of the electric power clamping apparatus according to the invention.

FIG. 2 shows the second example of an electric power clamping apparatus of the invention. This electric power clamping apparatus has a difference from the first embodiment only in the linkage means 55 inserted between the operation shaft 41 and the release lever 52 of the brake mechanism 50, and no difference in other constitution and operation. Accordingly, regarding the constitution and operation common with the electric power clamping apparatus of the first embodiment, the parts which are the same as or corresponding to those in the first embodiment are assigned the same reference number, and the description thereof will be omitted.

As the linkage means illustrated in FIG. 2, a bent spring material 55 having one end engaging with the middle part of the operation shaft 41 and the other end engaging with the release lever 52 of the brake mechanism 50 is used. This bent spring material 55 allows the body 1 to rotatably support the middle part with a pin 55*a*, and further allows a middle winding portion 55*b* to improve spring characteristics on operation of the operation shaft 41, and one end thereof is engaged with the operation shaft 41 and the other end is engaged with the release lever 52.

Further, by pressing the operation shaft 41 with the tool, the release lever 52 can be moved from the solid line position to the chain line position so as to make the brake mechanism 50 inoperative.

The invention claimed is:

1. An electric power clamping apparatus, which comprises:

a clamping arm for clamping a workpiece, an electric motor as a drive source of the clamping arm, a reduction mechanism for reducing a rotation of the electric motor by a plurality of gears, a link mechanism for transmitting an output of the reduction mechanism to the clamping arm, and a manual operation mechanism for manually operating the clamping arm, wherein the manual operation mechanism has an operation shaft provided for manually operating rotatably and movably back and forth by an external tool and a small gear mounted on the operation shaft into a body of the apparatus and is constructed so as to make the clamping arm operate through the reduction mechanism and the link mechanism by rotating the operation shaft in a state to make said small gear mesh with one of the gears of the reduction mechanism by making the operation shaft advance so as to move the operation shaft back, when a manual operation is not performed, and to separate the small gear from one of the gears of the reduction mechanism, and wherein a mechanism for moving a release lever and making a brake mechanism be inoperative connects with the operation shaft and the release lever in the brake mechanism attached to the drive system of the electric motor when the operation shaft is manually operated and said small gear mounted on the operation shaft meshes with one of the gears of the reduction mechanism.

2. The electric power clamping apparatus according to claim 1, wherein the gear of the reduction mechanism meshed with said small gear comprises a gear directly driven by the electric motor when manually operating the clamping arm.

3. The electric power clamping apparatus according to claim 1, wherein the operation shaft is fit by insertion into the body with an operation end of the operation shaft facing an opposite side to an operation range of the clamping arm in the body.

4. The electric power clamping apparatus according to claim 1, wherein the gear of the reduction mechanism and said small gear of the operation shaft comprise bevel gears meshing with each other.

5. The electric power clamping apparatus according to claim 1, wherein the linkage means is an operation link mechanism having one end engaging with the operation shaft and the other end engaging with the release lever of the brake mechanism.

6. The electric power clamping apparatus according to claim 1, wherein the linkage means is a bent spring material having one end engaging with the operation shaft and the other end engaging with the release lever of the brake mechanism.

7. The electric power clamping apparatus according to claim 1, comprising a sensor provided in the body for detecting an operating position of the operation shaft.

8. The electric power clamping apparatus according to claim 4, wherein the linkage means is an operation link mechanism having one end engaging with the operation shaft and the other end engaging with the release lever of the brake mechanism.

9. The electric power clamping apparatus according to claim 4, wherein the linkage means is a bent spring material having one end engaging with the operation shaft and the other end engaging with the release lever of the brake mechanism.

10. The electric power clamping apparatus according to claim 4, comprising a sensor provided in the body for detecting an operating position of the operation shaft.

11. The electric power clamping apparatus according to claim 5, comprising a sensor provided in the body for detecting an operating position of the operation shaft.

12. The electric power clamping apparatus according to claim 6, comprising a sensor provided in the body for detecting an operating position of the operation shaft.

* * * * *